United States Patent [19]

Lynch

[11] Patent Number: 4,608,691
[45] Date of Patent: Aug. 26, 1986

[54] SIGNATURE ANALYZER CARD

[75] Inventor: James Lynch, San Jose, Calif.

[73] Assignee: The Singer Company, Binghamton, N.Y.

[21] Appl. No.: 591,090

[22] Filed: Mar. 19, 1984

[51] Int. Cl.[4] ............................................. G01R 31/28
[52] U.S. Cl. ..................................... 371/25; 324/73 R
[58] Field of Search ............... 371/25, 20; 324/73 R, 324/73 AT

[56] References Cited

U.S. PATENT DOCUMENTS

| | | | |
|---|---|---|---|
| 4,320,509 | 3/1982 | Davidson | 371/25 |
| 4,433,413 | 2/1984 | Fasang | 371/25 |
| 4,441,074 | 4/1984 | Bockett-Pugh et al. | 324/73 R |
| 4,454,600 | 6/1984 | LeGresley | 371/25 |
| 4,498,172 | 2/1985 | Bhavsar | 371/25 |
| 4,498,174 | 2/1985 | LeGresley | 371/25 X |
| 4,503,537 | 3/1985 | McAnney | 371/25 |
| 4,534,028 | 8/1985 | Trischler | 371/25 |

OTHER PUBLICATIONS

Bhavsar et al., Self-Testing by Polynomial Division, Digest of Papers, 1981 Intl. Test Conference, IEEE, pp. 208-216.
Konemann et al., Built-in Test for Complex Digital Integrated Circuits, Fifth European Solid State Conf., ESSCIRC 79, Southampton, England, Sep. 18-21, 1979, pp. 89-90.
Carter, Improved Signature Test for VLSI Circuits, IBM Technical Disclosure Bulletin, vol. 26, No. 3A, Aug. 1983, pp. 965-967.

Primary Examiner—Charles E. Atkinson
Attorney, Agent, or Firm—Douglas M. Clarkson

[57] ABSTRACT

A signature analyzer card 102 having sixteen cycle redundancy circuits 106 embodied within a cycle redundancy check generator 104 for serially receiving two thousand and forty-eight binary words 54 from a logic circuit card 22 under test when the cycle redundancy check generator 104 is in the write data in mode. Each cycle redundancy circuit 106 receives a serial stream of two thousand and forty-eight binary bits 144 with the logical value of each serial bit potentially changing the logical state of the cycle redundancy circuit 106. After the receipt of the two thousand and forty-eight binary words 54 and the read signature out mode is enabled, each cycle redundancy circuit 106 emits sixteen compressed serial binary bits 148. Each of the compressed serial binary bits 148 of each cycle redundancy circuit 106 combine to form one of sixteen generator output words 110 for providing an output signature 108 for verification by a diagnostic computer 40 indicating the validity of the two thousand and forty-eight binary words 54.

31 Claims, 6 Drawing Figures

SIGNATURE ANALYZER CARD

The Government has rights in this invention pursuant to Contract No. F33657-80-C-0010 awarded by the Department of the Air Force.

TECHNICAL FIELD

The invention relates generally to diagnostic testing and more particularly to automatic diagnostic testing of digital logic circuit cards employing a diagnostic computer.

BACKGROUND ART

In the art of digital electronics, complete logic circuits are resident on a single circuit card. The circuit card includes the connective circuitry necessary to insert the circuit card into a digital subsystem. This design permits convenient replacement of the circuit card upon its failure by a new circuit card. Automatic diagnostic testing is employed on a regular basis to verify the satisfactory operation of each subsystem within a main system and to isolate the failure of the particular circuit card within the subsystem. On many system designs, such as flight simulator systems, the automatic diagnostic testing is conducted prior to utilizing the flight simulator system for training by performing a morning readiness test. A major problem that existed in the prior art was that the automatic diagnostic test was time consuming. Each circuit node of each circuit card within each subsystem must be validated by comparison data located within the software programming of a diagnostic computer. Each session of diagnostic testing consumed as much as thirty minutes of computer time.

Typically, logic circuit cards are interconnected and the data flows from one circuit card to another. Each circuit card is equipped with a diagnostic tap to interrupt the normal data flow and intercept data for testing that is resident within the circuit card. The test data is comprised of binary words which contain sixteen bits of binary data and the number of the words to be tested will vary depending upon the subsystem and circuit card to be tested. The prior art included circuit cards containing two thousand and forty-eight words per circuit card that were required to be verified as accurate. The process of verification included comparing each of the two thousand and forty-eight words of test data from each circuit card with a table of accurate values which included two thousand and forty-eight words of valid comparison data for each circuit card stored in the software of the diagnostic computer. Interposed between the diagnostic tap of the circuit card under test and the diagnostic computer was a diagnostic holding register. The diagnostic holding register was a sixteen bit register that was connected to the diagnostic tap of the circuit card under test. Each of the two thousand and forty-eight words was serially transmitted to the diagnostic holding register which transmitted an interrupt signal to the diagnostic computer. A central processing unit of the diagnostic computer received the interrupt signal indicating that test data was available. The central processing unit accepted the test data only after a delay including the time to process the interrupt signal and accept each word. Two thousand and forty-eight time delays were incurred for each circuit card in addition to the time for data comparison. Thus, the purpose of the diagnostic holding register was to hold each sixteen bit word from the circuit card under test until the time delay passed and the central processing unit was prepared to accept transmission of the sixteen bit word. The summation of the time delays created a rate of speed problem which was the major contributor to the time consumption problem. Utilizing a faster diagnostic computer would be financially prohibitive and thus the time consumption problem of the prior art remained unsolved.

DISCLOSURE OF THE INVENTION

It is therefore an object of the present invention to provide a signature analyzer card capable of significantly reducing the computer time consumed for automatic diagnostic testing.

It is a further object to provide a signature analyzer card which compresses two thousand and forty-eight binary words into sixteen binary words for reducing the verification comparisons.

It is a further object to provide a signature analyzer card which may be provided at a relatively low cost compared to the cost of providing a faster diagnostic computer.

Briefly, a preferred embodiment of the present invention includes a signature analyzer card included within an automatic diagnostic testing circuit and used in conjunction with a diagnostic computer for verifying the satisfactory operation of or the failure of a logic circuit card under test included within a larger logic subsystem. The signature analyzer card includes an input buffer for receiving a plurality of binary data from an input bus. A cycle redundancy check generator is connected to the input buffer for receiving and accumulating a plurality of buffer output words. A plurality of cycle redundancy circuits are employed for providing an output signature comprised of compressed serial binary bits transmitted to a signature bus. A control block provides a plurality of timing control signals to the signature analyzer card. The control block includes a parameter register, a parameter decoder, and a read/write multiplexer. The parameter register provides a plurality of parameter register output signals to the signature analyzer card and to the parameter decoder which provides and distributes a plurality of enabling signals. The read/write multiplexer receives a parameter register output signal and is employed to select the write data in mode or the read signature out mode of the cycle redundancy check generator. An in strobe multiplexer receives a parameter register output signal and provides a plurality of in strobe signals for enabling the plurality of binary data onto the input data bus. A plurality of holding registers connected in parallel with the input buffer act as a supplementary input to the signature analyzer card for a second plurality of binary data. The plurality of holding registers and the input buffer are connected to a generator input bus and a bypass bus. An output multiplexer is connected to the signature bus and the bypass bus for selecting the compressed output signature or the plurality of buffer output words for transmission to the diagnostic computer. A table of accurate values is included within the software of the diagnostic computer for comparison with the output signature or the plurality of buffer output words.

A plurality of binary data is transmitted from the circuit card under test upon receipt of one of the plurality of in strobe signals for enabling the plurality of binary data onto the input data bus. The binary data is received by the input buffer, however multiple circuit cards may be connected to the signature analyzer card through the holding registers. The plurality of control signals permit one of the holding registers and the input buffer to be connected to the cycle redundancy circuits. The binary data can be transmitted to the cycle redundancy circuits or to the output multiplexer. This decision is made by the logical value of a signature analyzer control signal. If the binary data is transmitted to the output multiplexer, the signature analyzer mode is bypassed. If the binary data is transmitted to the cycle redundancy check generator and the write data in mode is enabled, each cycle redundancy circuit receives one binary bit from each binary word. The cycle redundancy check generator receives two thousand and forty-eight binary words with sixteen serial streams of two thousand and forty-eight binary bits each. The logical value of each of the two thousand and forty-eight bits of each serial stream potentially can change the logical state of the cycle redundancy circuit receiving that serial stream of bits. After the entry of the two thousand and forty-eight binary words and the read signature out mode is enabled, each cycle redundancy circuit emits sixteen compressed serial binary bits. Each of the compressed serial binary bits of each cycle redundancy circuit combine to formulate one of sixteen generator output words, each word being sixteen bits wide. All sixteen of the generator output words form an output signature which is transmitted to the signature bus and to the diagnostic computer for comparison with the table of accurate values.

An advantage of the signature analyzer card of the present invention is that the computer time consumed for automatic diagnostic testing is significantly reduced.

Another advantage is that the signature analyzer card compresses two thousand and forty-eight binary words into sixteen binary words for reducing the verification comparisons required.

A further advantage is that the signature analyzer card may be provided at a relatively low cost compared to the cost of providing a faster diagnostic computer.

These and other objects and advantages of the present invention will no doubt become obvious to those of ordinary skill in the art after having read the following detailed description of the preferred embodiment(s) which are illustrated in the various drawing figures.

BEST MODE FOR CARRYING OUT THE INVENTION

Figure 1:
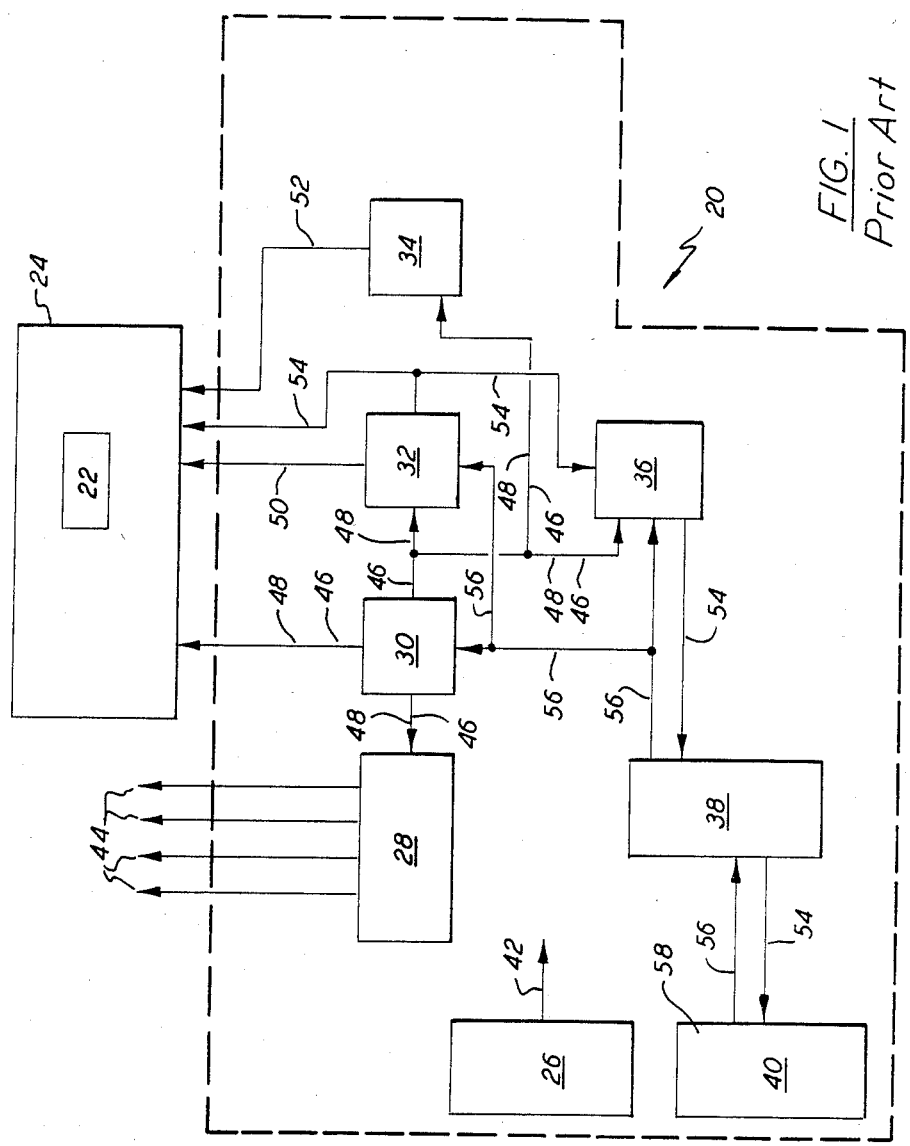
FIG. 1 is a partial system block diagram of an automatic diagnostic testing circuit illustrating a diagnostic holding register card of the prior art.

In FIG. 1, there is illustrated an automatic diagnostic testing circuit of the prior art referred to by the general reference character 20. The automatic diagnostic testing circuit 20 is comprised of all the testing circuitry necessary to diagnose a circuit card 22 under test located within a logic subsystem 24. The automatic diagnostic testing circuit 20 includes a clock generator card 26, a test generator card 28, a parameter memory card 30, a diagnostic control card 32, a system control card 34, a diagnostic holding register card 36, a diagnostic interface card 38 and a diagnostic computer 40. The clock generator card 26 generates a fundamental timing clock signal 42 which is distributed throughout the automatic diagnostic testing circuit 20 to each card heretofore mentioned. The fundamental timing clock signal 42 is employed to synchronize each card of the automatic diagnostic testing circuit 20. The test generator card 28 provides a plurality of test data 44 for testing the logic subsystem 24 when the automatic diagnostic testing circuit 20 is in the diagnostic mode. The parameter memory card 30 stores a plurality of numerical variables 46 which the automatic diagnostic testing circuit 20 and the logic subsystem 24 require for proper operation. The plurality of numerical variables 46 are periodically transmitted to a parameter bus 48 and distributed to several of the cards of the automatic diagnostic testing circuit 20. The diagnostic control card 32 enables the diagnostic mode by generating controls for the timing of a plurality of pulses 50 transmitted to the logic subsystem 24 and to the diagnostic holding register card 36. The system control card 34 provides a plurality of general control signals 52 to the logic subsystem 24. The diagnostic holding register card 36 is connected to the logic subsystem 24 for receiving a plurality of binary words 54 from the circuit card 22 under test. The diagnostic holding register card 36 provides a transmission delay of the plurality of binary words 54 to compensate for the interruption response time of diagnostic computer 40. The diagnostic holding register card 36 transmits the plurality of binary words 54 to the diagnostic computer 40 via the diagnostic interface card 38. The diagnostic interface card 38 serves as an interface between the diagnostic computer 40 and the diagnostic holding register card 36 and also as a conduit for the transmission of a plurality of computer messages 56 to the diagnostic holding register card 36, the parameter memory card 30 and the diagnostic control card 32. The diagnostic computer 40 receives the plurality of binary words 54 and compares each of the binary words 54 with a table of accurate values 58 located within the software of the diagnostic computer 40. The result of the comparisons is transmitted within the plurality of computer messages 56 for initiating the appropriate action.

Figure 2:
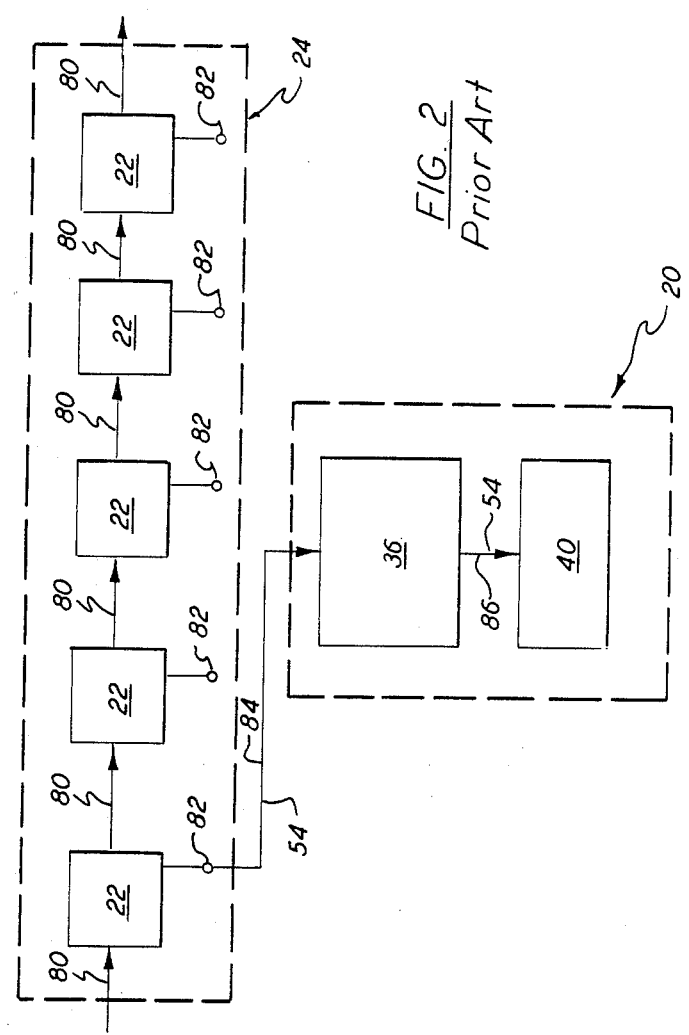
FIG. 2 is a detailed block diagram of the automatic diagnostic testing circuit of FIG. 1.

In FIG. 2, there is illustrated a selected portion of the automatic diagnostic testing circuit 20 of the prior art. The logic subsystem 24 is shown including a plurality of the circuit card 22 under test. A plurality of binary data 80 is shown flowing between each circuit card 22 under test. Each circuit card 22 under test includes at least one diagnostic tap 82 for intercepting the normal flow of the plurality of binary data 80. The diagnostic holding register card 36 and the diagnostic computer 40 are shown connected within the automatic diagnostic testing circuit 20. The diagnostic tap 82 is connected to the diagnostic holding register card 36 via sixteen backplate conductors 84. The plurality of binary data 80 flowing between the circuit cards 22 under test are sixteen bits wide which means that the plurality of binary data 80 contains sixteen binary bits in parallel. The plurality of binary words 54 which are transmitted to the diagnostic holding register card 36 are also sixteen bits wide. In order to decide if one of the plurality of circuit cards 22 under test satisfies the diagnostic testing, a complete sweep of the plurality of binary data 80 must be tested. A complete sweep includes two thousand and forty-eight of the sixteen bit binary words 54. Therefore, one bit of each sixteen bit binary word 54 is transmitted on each of the sixteen backplate conductors 84. The diagnostic holding register card 36 is a sixteen bit register that stores each of the sixteen bit binary words 54 as they are transmitted from each circuit card 22 under test until the computer reads each of the sixteen bits of each binary word 54. The two thousand and forty-eight binary words 54 are each transmitted to the diagnostic holding register card 36. The first of the two thousand and forty-eight binary words 54 are loaded into the diagnostic holding register card 36 prior to transmission to the diagnostic computer 40. Before each of the sixteen bit binary words 54 can be transmitted, the diagnostic computer 40 must be prepared to accept each binary word 54. Thus, the automatic diagnostic testing circuit 20 transmits an interrupt signal 86 to the diagnostic computer 40 to notify the diagnostic computer 40 that one of the plurality of binary words 54 is ready to be compared. The diagnostic computer 40 includes software containing the table of accurate values 58 which is a numerical table of binary data. The accurate values 58 are the correct values of each of the two thousand and forty-eight binary words 54 that are compared with each binary word 54 as if it is received. A delay exists between the time of the loading of each of the sixteen bit binary words 54 into the diagnostic holding register card 36 and the time at which the diagnostic computer 40 accepts the binary word 54 for comparison with the table of accurate values 58. Thus, the diagnostic holding register card 36 interjects a delay of several microseconds to permit the diagnostic computer 40 to be addressed and to respond. The delay, which is usually several clock pulses in length, is interjected after each binary word 54 is loaded into the diagnostic holding register card 36 but before the diagnostic computer 40 responds. Thus, there are two thousand and forty-eight delays for each circuit card 22 under test. As each of the two thousand and forty-eight binary words 54 are transmitted to the diagnostic computer 40, the next binary word 54 is loaded into the diagnostic holding register card 36 cancelling the voltage level of the previous binary word 54. Each of the two thousand and forty-eight binary words 54 are fed serially to the table of accurate values 58 for a comparison decision. The diagnostic computer 40 then initiates one of the plurality of computer messages 56 which is appropriate. The diagnostic computer 40 employed in the prior art and in the present invention may be one of several digital computers. One acceptable computer is a thirty-two bit mini-computer manufactured by the Perkin-Elmer Company. The memories and busses of the diagnostic computer 40 are organized such as to accommodate thirty-two parallel bit binary words.

FIGS. 1 and 2 have been included to provide a background for understanding the present invention.

Figure 3:
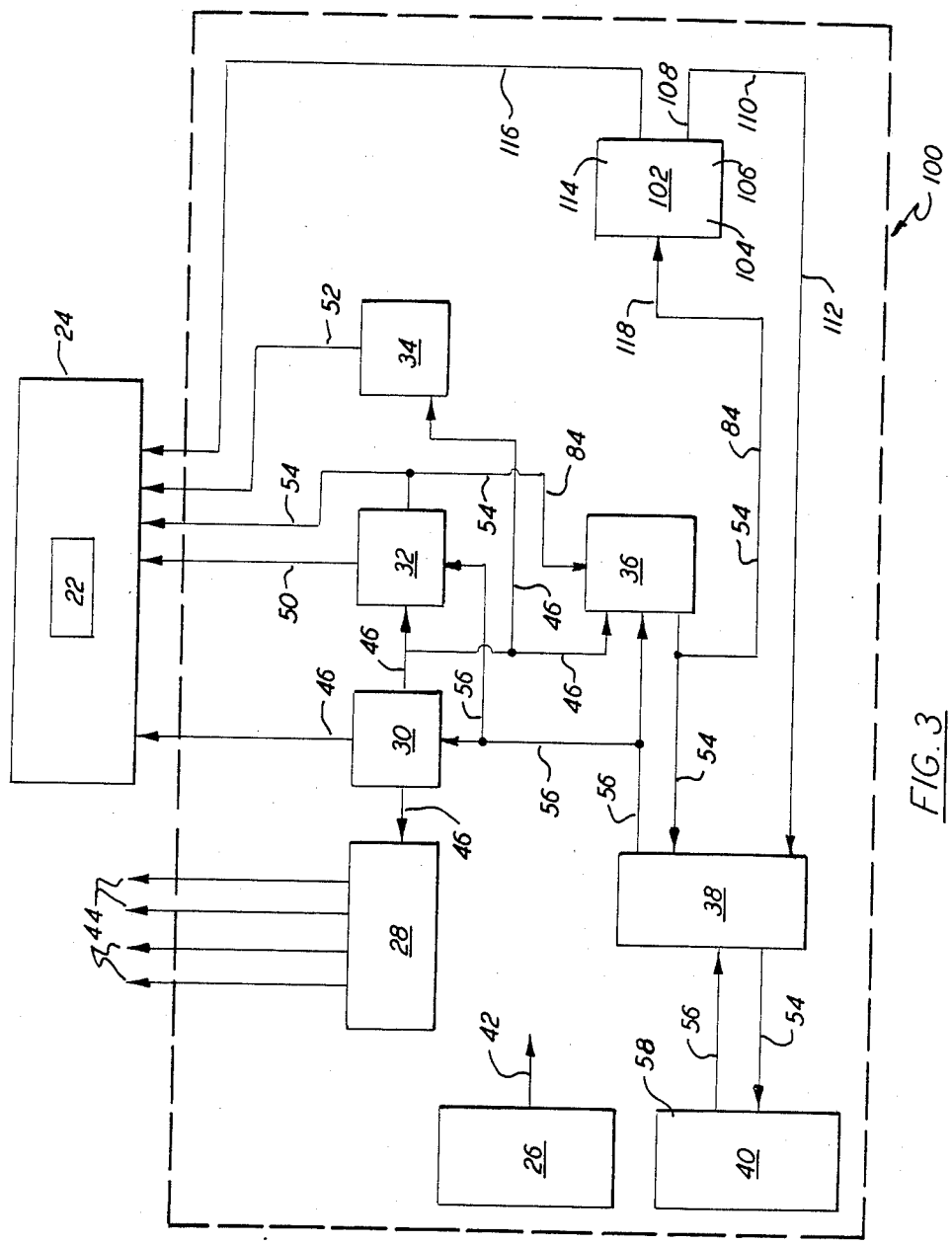
FIG. 3 is a partial system block diagram of an automatic diagnostic testing circuit illustrating a signature analyzer card in accordance with the present invention.

In FIG. 3, there is illustrated an automatic diagnostic testing circuit referred to by the general reference character 100 and incorporating the present invention. The automatic diagnostic testing circuit 100 includes each of the elements with identical functions as recited in connection with the automatic diagnostic testing circuit 20 of the prior art. The automatic diagnostic testing circuit 100 further includes a signature analyzer card 102. The signature analyzer card 102 receives the plurality of binary words 54 from the diagnostic holding register card 36. The signature analyzer card 102 includes a cycle redundancy check generator 104 comprised of a plurality of sixteen cycle redundancy circuits 106. The plurality of binary words 54 includes two thousand and forty eight binary words 54, each being sixteen bits wide as previously described. The sixteen cycle redundancy circuits 106 each receive one bit of each of the two thousand and forty-eight binary words 54 and through a process of accumulation of logical values, the two thousand and forty-eight binary words 54 are compressed into an output signature 108 comprised of a plurality of sixteen generator output words 110 each being sixteen bits wide. The output signature 108 is transmitted to a signature bus 112 which is connected to the diagnostic interface card 38. The signature analyzer card 102 further includes an in strobe multiplexer circuit 114 which generates a plurality of in strobe signals 116 which are transmitted to the circuit card 22 under test for enabling the plurality of binary words 54 onto an input data bus 118 comprised of the sixteen backplate conductors 84.

Figure 4:
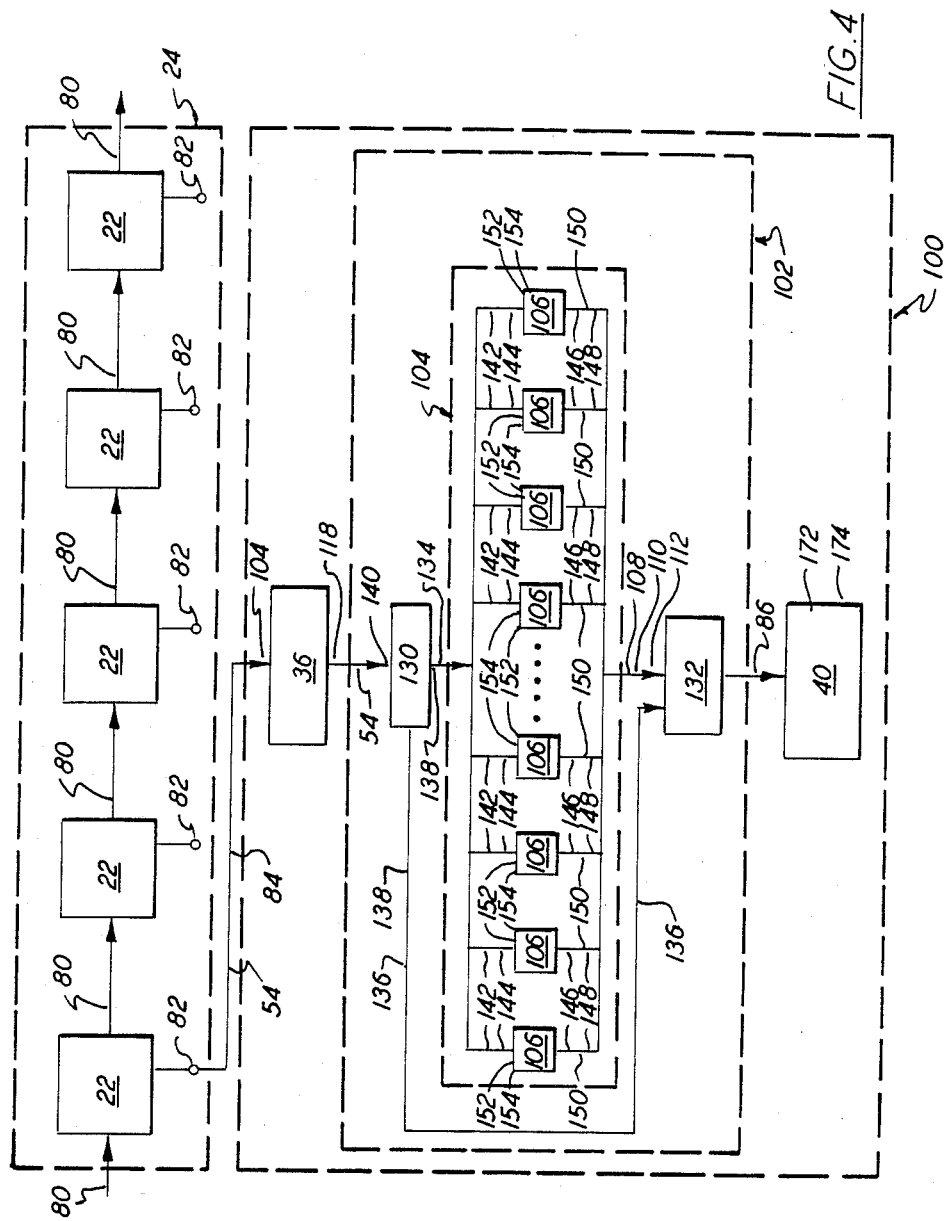
FIG. 4 is a detailed block diagram of the automatic diagnostic testing circuit of FIG. 3.

In FIG. 4, there is illustrated a selected portion of the automatic diagnostic testing circuit 100. The logic subsystem 24 is shown including the plurality of circuit cards 22 under test. The plurality of binary data 80 is shown flowing between the circuit cards 22 under test and the plurality of binary words 54 is shown being transmitted from the diagnostic tap 82 via the sixteen backplate conductors 84. The automatic diagnostic testing circuit 100 includes the diagnostic holding register card 36, the input data bus 118, the diagnostic computer 40 and the signature analyzer card 102. The signature analyzer card 102 includes the cycle redundancy check generator 104 and the sixteen cycle redundancy circuits 106. The signature analyzer card 102 further includes an input buffer 130 and an output multiplexer 132. The input buffer 130 is connected to the cycle redundancy check generator 104 by a generator input bus 134. The output multiplexer 132 is connected to the plurality of cycle redundancy circuits 106 via the signature bus 112 and is also connected to the input buffer 130 via a bypass bus 136. The input buffer 130 provides a plurality of buffer output words 138 to the cycle redundancy check generator 104 and to the output multiplexer 132. The input buffer 130 is electrically connected to the input data bus 118 which is connected to the circuit card 22 under test. The input buffer 130 serves to receive serially the plurality of binary words 54 from the input data bus 118 and to provide the plurality of buffer output words 138 as previously noted. The plurality of binary words 54 and the plurality of buffer output words 138 are each sixteen bits wide and the plurality of binary words 54 are a complete sweep of the plurality of binary data 80. The automatic diagnostic testing circuit 100 is designed to provide the signature analyzer mode of verifying the plurality of binary words 54 or to provide the diagnostic holding register mode of verifying the plurality of binary words 54. The input buffer 130 will route the plurality of buffer output words 138 to the output multiplexer 132 on the bypass bus 136 if the signature analyzer mode is not enabled. Conversely, the input buffer 130 will route the plurality of buffer output words 138 to the cycle redundancy check generator 104 if the signature analyzer mode is enabled. The diagnostic holding register card 36 includes several more input nodes 140 than does the signature analyzer card 102 and was retained in the automatic diagnostic testing circuit 100 to accommodate several inputs from the plurality of circuit cards 22 under test in addition to providing an alternate path for logic comparison. The input buffer 130 is of the tri-state, inverting type. The input buffer 130 also acts to isolate the plurality of binary words 54 from electrical noise common on long electrical lines. The inverting feature results in the logical state of the plurality of buffer output words 138 being opposite to the logical state of the plurality of binary words 54. A tri-state device is one which can assume the value of logical zero, logical one or a high impedance state. Normally, the tri-state feature is incorporated to eliminate other structural hardware. If the output of two tri-state circuits are joined, and one of the circuits is set to the high impedance state, then the logical state of the other circuit will control the output. Thus, the input buffer 130 can be tied to a second register to cooperate in controlling the output to the cycle redundancy check generator 104.

The cycle redundancy check generator 104 is connected to the input buffer 130. Each of the cycle redundancy circuits 106 receives one bit of each of the two thousand and forty-eight buffer output words 138 through a plurality of input leads 142. Each bit of each of the two thousand and forty-eight buffer output words 138 forms one bit of one of a plurality of sixteen serial binary bit streams 144. Thus, the logical state of each of the sixteen cycle redundancy circuits 106 is dependent upon the logical value of each bit of each of the serial binary bit streams 144 transmitted to each of the sixteen cycle redundancy circuits 106. The internal logic of each cycle redundancy circuit 106 is cleared to a known reference state before receiving one of the serial binary bit streams 144 across the input lead 142. Each of the cycle redundancy circuits 106 includes an electronic logic circuit that accumulates the bits of the serial binary bit stream 144 passing therethrough. Each bit also contributes to form each buffer output word 138. Thus, as each of the two thousand and forty-eight buffer output words 138 is transmitted to the sixteen cycle redundancy circuits 104, the sixteen logic circuits potentially can change state two thousand and forty-eight times depending upon the logical value of each bit. All two thousand and forty eight bits of the first of the serial binary bit streams 144 is transmitted to the first of the cycle redundancy circuits 106 before a first output 146 comprised of a plurality of sixteen compressed serial binary bits 148 is observed. Likewise, all two thousand and forty-eight bits of the second through the sixteenth of the serial binary bit streams 144 is transmitted to the second through the sixteenth of the cycle redundancy circuits 106 before the second through the sixteenth outputs 146 each comprised of sixteen compressed serial binary bits 148 is observed. Each output 146 is compressed as the result of the accumulation previously described and is transmitted to one of a plurality of sixteen output leads 150. Each output lead 150 carries sixteen compressed serial binary bits 148 with the first compressed serial binary bit 148 of the first cycle redundancy circuit 106 forming the first compressed serial binary bit 148 of the first generator output word 110. The first compressed serial binary bit 148 of the second through the sixteenth cycle redundancy circuits 106 form the second through the sixteenth compressed serial binary bits 148 of the first generator output word 110. Likewise, the second through the sixteenth compressed serial binary bits 148 of the first cycle redundancy circuit 106 forms the first compressed serial binary bit 148 of the second through the sixteenth generator output words 110. The second through the sixteenth compressed serial binary bits 148 of the second through the sixteenth cycle redundancy circuits 106 form the second through the sixteenth compressed serial binary bits 148 of the second through the sixteenth generator output words 110. The result is a block of sixteen generator output words 110 each comprised of sixteen compressed serial binary bits 148. The block of sixteen generator output words 110 forms the output signature 108 which is transmitted onto the signature bus 112. The compression of the plurality of binary words 54 by the sixteen cycle redundancy circuits 106 has reduced the number of necessary comparisons by the diagnostic computer 40 from two thousand and forty-eight to sixteen. If the output signature 108 fails to match the expected result stored in the table of accurate values 58 of the diagnostic computer 40 then the circuit card 22 under test is defective. The diagnostic computer 40 cannot indicate which of the two thousand and forty-eight binary words 54 is defective. It is not possible to reverse the process in order to reproduce the two thousand and forty-eight binary words 54 that were compressed. However, if only one bit in one of the two thousand and forty-eight binary words 54 is incorrect, the output signature 108 will not match the table of accurate values 58. Thus, the signature analyzer card 102 provides a GO-NO GO test that provides an enormous time advantage by reducing the number of comparisons required.

The accumulation of the bits of the serial bit streams 144 by the cycle redundancy circuits 106 is not a storage of the bits. The logic circuit in each cycle redundancy circuit 106 is controlled by an algorithm 152 permanently stored within each cycle redundancy circuit 106. The algorithm 152 accepts, a polynomial 154 used to program the cycle redundancy circuit 106 to accumulate the binary words 54. The variables of the algorithm 152 may be changed by changing the polynomial 154. The polynomial 154 is like a key to a lock in that the method by which the binary words 54 are encoded within the cycle redundancy circuit 106 is dependent upon the polynomial 154 written into the algorithm 152. An example of an acceptable polynomial is the cycle redundancy check-16 polynomial which is disclosed in the technical article entitled "Cyclic Checks For Error Detection" included within the Macrologic Bipolar Microprocessor Databook at pages (5-21) to (5-29) published by the Fairchild Camera and Instrument Corporation, copyright 1976.

The output signature 108 on the signature bus 112 and the plurality of buffer output words 138 from the input buffer 130 on the bypass bus 136 are both transmitted to the output multiplexer 132. A multiplexer in a digital application is a device that has two or more inputs. If a first input is selected, then the voltage at the first input will also be the voltage available at the output of the multiplexer. The output multiplexer 132 is a tri-state, inverting device which selects either the signature bus 112 or the bypass bus 136 for connection to the diagnostic computer 40. If the automatic diagnostic testing circuit 100 is in the signature analyzer mode, the signature bus 112 will be connected to the diagnostic computer 40 for analyzing the output signature 108 but if the diagnostic holding register mode is selected, the bypass bus 136 will be connected to the diagnostic computer 40 for analyzing the two thousand and forty-eight buffer output words 138. The signature analyzer mode is enabled if a signature analyzer control signal 170 (shown in FIG. 5) is a logical one. Then the output signature 108 is compared with a first expected logical character 172 having sixteen binary words of sixteen bits each stored in the table of accurate values 58. The bypass 136 is selected if the signature analyzer control signal 170 is a logical zero. Then the plurality of buffer output words 138 is compared with a second expected logical character 174 having two thousand and forty-eight binary words of sixteen bits each stored in the table of accurate values 58. The first expected logical character 172 should match the sixteen generator output words 110 and the second expected logical character 174 should match the two thousand and forty-eight buffer output words 138. Thus, the first expected logical character 172 has fewer binary characters than does the second expected logical character 174. The comparisons are for verifying the accuracy of the plurality of binary data 80 and for isolating a failure to the circuit card 22 under test. The output multiplexer 132 will transmit the selected output upon command via one of the plurality of computer messages 56. All sixteen of the generator output words 110 must be read in serial by the diagnostic computer 40 to sense the internal state of each cycle redundancy circuit 106. The interrupt signal 86 is sent to the diagnostic computer 40 and then the first of the sixteen generator output words 110 are read by the diagnostic computer 40. After the first comparison, the interrupt signal 86 is sent for the second of the sixteen generator output words 110. The diagnostic computer 40 reads the second of the sixteen generator output words 110 which cancels the first of the sixteen generator output words 110. The diagnostic computer 40 can store all the expected logical characters in the table of accurate values 58 for comparisons by one of two methods. The first method is by the use of FORTRAN software that emulates the cycle redundancy circuits 106. Test data is transmitted to the diagnostic computer 40 which is compressed in the same manner as in the cycle redundancy circuits 106. The second method is for the diagnostic computer 40 to read the output signature 108 from a known reference source and store it in the table of accurate values 58.

Figure 5:
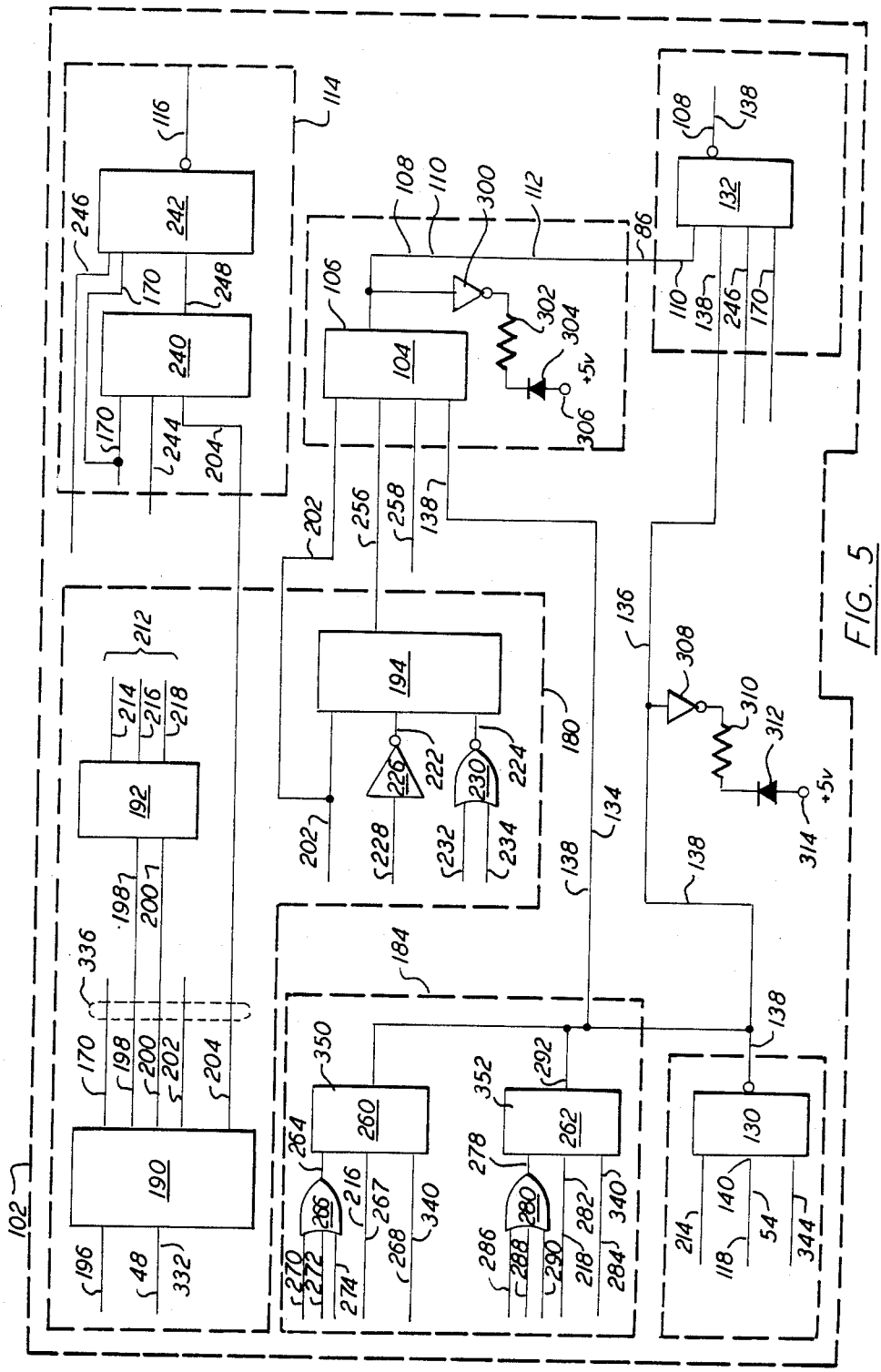
FIG. 5 is a detailed block diagram of the signature analyzer card of FIG. 3.

In FIG. 5, there is illustrated a detailed block diagram of the signature analyzer card 102. The signature analyzer card 102 is shown divided into six blocks which comprise the input buffer 130, the cycle redundancy check generator 104, the output multiplexer 132, the In Strobe multiplexer circuit 114, a control block 180 and a plurality of holding registers 184. The input buffer 130, the output multiplexer 132 and the cycle redundancy check generator 104 operate in the same manner as heretofore described in FIG. 4.

The control block 180 further includes a parameter register 190, a parameter decoder 192, and a read/write multiplexer 194. The parameter register 190 receives the parameter bus 48 and a Load Enabling signal 196. The parameter register 190 includes as output signals the Signal Analyzer Control signal 170, a First Input Bus Code signal 198, a Second Input Bus Code signal 200, a Read Not/Write control signal 202 and a plurality of Input Level signals 204. The parameter decoder 192 receives the First Input Bus Code signal 198 and the Second Input Bus Code signal 200 as input signals. A plurality of Enabling output signals 212 of the parameter decoder 192 include an Enable Input Buffer signal 214, an Enable First Auxiliary Bus signal 216, and an Enable Second Auxiliary Bus signal 218. The read/write multiplexer 194 receives as input signals the Read Not/Write control signal 202, a Read Out clock signal 222, and a Write In clock signal 224. The Read Out clock signal 222 is derived from a logical inverter gate 226 having an Output Strobe Not input signal 228. The Write In clock signal 224 is derived from a logical nor gate 230 having an Enable In Not input signal 232 and a Clock In Not input signal 234 as input signals.

The In Strobe multiplexer circuit 114 further includes an In Strobe multiplexer 240 and a multiplexer decoder 242. The In Strobe multiplexer 240 receives as input signals the Signature Analyzer Control signal 170, a Device Address signal 244, and the plurality of Input Level signals 204. The multiplexer decoder 242 receives as input signals an Input Strobe Not input signal 246, the Signature Analyzer Control signal 170, and an In Strobe multiplexer output signal 248. The multiplexer decoder 242 includes the plurality of In Strobe signals 116 as an output signal.

The input buffer 130 further receives the Enable Input Buffer signal 214. The output multiplexer 132 further receives the Signature Analyzer Control signal 170 and the Input Strobe Not input signal 246. The output signal of the output multiplexer 132 is the output signature 108 or the plurality of buffer output words 138. The cycle redundancy check generator 104 further includes as input signals the Read Not/Write control signal 202, a Read/Write Multiplexer output signal 256 and a Generator Clear Not input signal 258. The plurality of holding registers 184 further includes a first holding register 260 and a second holding register 262. The first holding register 260 includes a First OR signal 264 from a first OR gate 266. The first holding register 260 further receives the Enable First Auxiliary Bus signal 216 on a first auxiliary enabling bus 267 and is further connected to a first auxiliary data bus 268. The first OR gate 266 receives as input signals an Enable Auxiliary One Not signal 270, and Enable Auxiliary Two Not signal 272, and a First Clock Not signal 274. The first holding register 260 includes a First Holding Register output signal 276. The second holding register 262 includes a Second OR signal 278 from a second OR gate 280. The second holding register 262 further receives the Enable Second Auxiliary Bus signal 218 on a second auxiliary enabling bus 282 and is further connected to a second auxiliary data bus 284. The second OR gate 280 receives as input signals an Enable Auxiliary Three Not signal 286, an Enable Auxiliary Four Not signal 288 and a Second Clock Not signal 290. The second holding register 262 includes a Second Holding Register output signal 292. The signature bus 112 further includes a first logical inverter gate 300, a first resistor 302, a first light-emitting diode 304 and a first voltage terminal 306. The bypass bus 136 further includes a second logical inverter gate 308, a second resistor 310, a second light-emitting diode 312, and a second voltage terminal 314.

The control block 180 is electrically connected to the cycle redundancy check generator 104, the In Strobe multiplexer circuit 114, the input buffer 130, the plurality of holding registers 184, and the output multiplexer 132 for providing a plurality of timing control signals to the signature analyzer card 102. The timing control signals collectively include the signals 170, 196, 198, 200, 202, 204, 214, 216, 218, 222 and 224. The control block 180 receives an eight parameter bit input 332 on the parameter bus 48 from a backplate wiring panel (not shown). The backplate wiring panel is the wiring device that each circuit card 22 under test plugs into. The eight parameter bit input 332 is loaded into the parameter register 190 using the trailing edge of the Load Enabling signal 196 which is also received from the backplate wiring panel. A plurality of Parameter Register output signals 336 forms five of the plurality of timing control signals for controlling the operation of the signature analyzer card 102. The four least significant bits of the eight parameter bit input 332 form the four bit Input Level signal 204 which is sent to the In Strobe multiplexer 240. The four bit Input Level signal 204 comprises four binary bits forming a first of said plurality of timing control signals which is transmitted to the multiplexer decoder 242. The multiplexer decoder 242 decodes the four binary bits by examining the four binary bits to determine the sixteen possible combinations of logical ones and zeros. For each combination there is a unique output signal and the unique output signal of the combination selected by the four binary bits assumes a logical zero while the remaining fifteen unique output signals assume the value of logical one. The function of the In Strobe multiplexer 240 and multiplexer decoder 242 is to multiplex the Input Level signals 204 with the Device Address signal 244 received from the backplate wiring panel. If the Signature Analyzer Control signal 170 is a logical one, the Input Level signals 204 will be selected, otherwise the Device Address signal 244 will be selected. The multiplexer decoder 242 selects one of the sixteen combinations for providing a plurality of sixteen of the In Strobe signals 116. The purpose of the sixteen In Strobe signals 116 is to enable the plurality of binary words 54 onto the input data bus 118 and the output signal out of the output multiplexer 132. If the voltage levels are acceptable, the plurality of binary words 54 are enabled onto the input data bus 118 and the output signal of the output multiplexer 132 is transmitted to the diagnostic computer 40. Note that the Input Strobe Not input signal 246 and the Signature Analyzer Control signal 170 together enable the multiplexer decoder 242.

The most significant bit of the eight parameter bit input 332 forms the Signature Analyzer Control signal 170 which is the second of the plurality of timing control signals. The Signature Analyzer Control signal 170 is transmitted to the In Strobe multiplexer circuit 114 and to the output multiplexer 132. The output multiplexer 132 connects either the signature bus 112 or the bypass bus 136 to the diagnostic computer 40. The selection is determined by the logical value of the Signature Analyzer Control signal 170. If the read signature out mode is enabled, the Signature Analyzer Control signal 170 is a logical one and the signature bus 112 will be selected, otherwise the bypass bus 136 will be selected. The bypass bus 136 is fed by the input buffer 132 and the plurality of holding registers 184.

The parameter register 190 is enabled by the Load Enabling signal 196 transmitted from the parameter memory card 30. The Load Enabling signal 196 is a third of the plurality of the timing control signals. The Load Enabling signal 196 acts to clock the eight parameter bit input 332 into the parameter register 190. The parameter decoder 192 is connected to the parameter register 190 for receiving two of the plurality of Parameter Register output signals 336. These include the First Input Bus Code signal 198 which is the fourth of the plurality of the timing control signals and the Second Input Bus Code signal 200 which is the fifth of the plurality of the timing control signals. The parameter decoder 192 decodes the First and the Second Input Bus Code signals 198,200 to provide the plurality of Enabling output signals 212 to the signature analyzer card 102. The first of the plurality of the Enabling output signals 212 is the Enable Input Buffer signal 214 transmitted to the input buffer 130. The Enable Input Buffer signal 214 is the sixth of the plurality of timing control signals and enables the input buffer 130 to receive the plurality of binary words 54. The second of the plurality of the Enabling output signals 212 is the Enable First Auxiliary Bus signal 216 transmitted to the first of the plurality of holding registers 260 on the first of the plurality of auxiliary enabling buses 267. The Enable First Auxiliary Bus signal 216 is the seventh of the plurality of timing control signals and enables the first of the plurality of holding registers 260 to receive a second plurality of binary words 340 on the first auxiliary data bus 268. The third of the plurality of Enabling output signals 212 is the Enable Second Auxiliary Bus signal 218 transmitted to the second of the plurality of holding registers 262 on the second of the plurality of auxiliary enabling buses 282. The Enable Second Auxiliary Bus signal 218 is the eighth of the plurality of timing control signals and enables the second of the plurality of holding registers 262 to receive the second plurality of binary words 340 on the second auxiliary data bus 284.

The Read Not/Write control signal 202 is transmitted to the read/write multiplexer 194 which also receives the Read Out clock signal 222 and the Write In clock signal 224. The Read Out clock signal 222 is formed by the first logic gate which is the logical inverter gate 226. The input to the inverter gate 226 is the Output Strobe Not input signal 228 which is received from the backplate wiring panel (not shown). The Read Out clock signal 222 will asynchronously read off the output signature 108 onto the sixteen bit signature bus 112. The Read Out clock signal 222 is the ninth of the plurality of timing control signals. The Write In clock signal 224 is formed by the second logic gate which is the logical nor gate 230. The inputs to the nor gate 230 are the Enable In Not input signal 232 and the Clock In Not input signal 234, each received from the backplate wiring panel (not shown). The Write In clock signal 224 is the tenth of the plurality of timing control signals. The Read Out clock signal 222 and the Write In clock signal 224 thus derived are multiplexed within the read/write multiplexer 194 using the Read Not/Write control signal 202 from the parameter register 190. The multiplexing provides the Read/Write Multiplexer output signal 256 which is transmitted to the cycle redundancy check generator 104. When the Read Not/Write control signal 202 is a logical one, the Write In clock signal 224 is selected as the Read/Write Multiplexer output signal 256. The Write In clock signal 224 strobes the plurality of buffer output words 138 to facilitate the accumulation of the plurality of serial binary bit streams 144 within each of the cycle redundancy circuits 106. When the Read Not/Write control signal 202 is a logical zero, the Read Out clock signal 222 is selected as the Read/Write Multiplexer output signal 256. The Read Out clock signal 222 facilitates the transmission of the output signature 108 onto the signature bus 112. The selection of the Read Out clock signal 222 or the Write In clock signal 224 as the Read/Write Multiplexer output signal 256 is controlled by the Read Not/Write control signal 202 which is the eleventh of the plurality of timing control signals. Normally, the Read Not/Write control signal 202 is held at the logical one level until all the buffer output words 138 are clocked into the cycle redundancy check generator 104 and the computation of the output signature 108 is under progress. Then the Read Not/Write control signal 202 is reduced to the logical zero level to initiate the reading out of the sixteen generator output words 110.

The first holding register 260 and the second holding register 262 are each connected to the control block 180 and are both designed to receive and delay the transmission of the second plurality of binary words 340. The second plurality of binary words 340 is transmitted from one of the circuit cards 22 under test and may be transmitted to either or both the first holding register 260 and the second holding register 262. It is to be understood that the first holding register 260 and the second holding register 262 may replace or work in conjunction with the input buffer 130. However, the first holding register 260 and the second holding register 262 may not operate simultaneously and the Enabling output signal 212 sent from the parameter decoder 192 determines which will operate. The second plurality of binary words 340 is the same type of diagnostic data as is the plurality of binary data 54 transmitted to the input buffer 130. Each word of the two thousand and forty-eight binary words 340 is sixteen bits wide and is received serially from either the first auxiliary data bus 268 or the second auxiliary data bus 284 and represents the plurality of binary data 80 located within the circuit card 22 under test. The first and second holding registers 260, 262 are of the tri-state type whose function is to capture and delay the second plurality of binary words 340 for two hundred nanoseconds while the plurality of binary words 340 are held stable. The second plurality of binary words 340 is held stable when the voltage signal of the binary words 340 is non-changing as the cycle redundancy check generator 104 processes them. The first and second holding registers 260, 262 are capable of interfacing with a maximum of sixteen circuit cards 22 under test per holding register. Although a maximum of sixteen circuit cards 22 may be wired to one holding register simultaneously, only one circuit card 22 may be tested at any one time. The first holding register 260 is enabled by the Enable First Auxiliary Bus signal 216 and the second holding register 262 is enabled by the Enable Second Auxiliary Bus signal 218, each transmitted from the parameter decoder 192. The second plurality of binary words 340 is loaded into either holding register 260, 262 by the lagging edge of one of two clock signals. The first clock signal transmitted to the first holding register 260 is the First OR signal 264 comprised of the Enable Auxiliary One Not signal 270, the Enable Auxiliary Two Not signal 272 and the First Clock Not signal 274. The second clock signal transmitted to the second holding register 262 is the Second OR signal 278 comprised of the Enable Auxiliary Three Not signal 286, the Enable Auxiliary Four Not signal 288 and the Second Clock not signal 290. The holding registers 260, 262 change logical state on any transition from a logical zero to a logical one of the First OR signal 264 and the Second OR signal 278. If all the inputs to the first OR gate 266 are logical zero and one of the inputs changes to a logical one, the First OR signal 264 will undergo a transition from logical zero to logical one and cause the second plurality of binary words 340 to be clocked into the holding register 260. The procedure is the same for the second OR gate 280. The first holding register 260 includes a first plurality of flip flop circuits 350 and the second holding register 262 includes a second plurality of flip flop circuits 352 for capturing and storing for a period of two hundred nanoseconds each of the two thousand and forty-eight serially transmitted sixteen bit binary words 340. Each bit of each binary word 340 is transmitted to one of the cycle redundancy circuits 106. The first holding register 260 emits the First Holding Register output signal 276 while the second holding register 262 emits the Second Holding Register output signal 292. Either the First Holding Register output signal 276 or the Second Holding Register output signal 292 is transmitted to the cycle redundancy check generator 104 and to the output multiplexer 132. If the Signature Analyzer Control signal 170 is not a logical one, then one of the two holding registers 260, 262 feed the output multiplexer 132.

The circuit outputs of the first holding register 260, the second holding register 262 and the input buffer 130 are connected together and since each is a tri-state device, the result is the sixteen bit bypass bus 136. The driving signal on the bypass bus 136 will be the Enable Input Buffer signal 214, the Enable First Auxiliary Bus signal 216 or the Enable Second Auxiliary Bus signal 218.

The diagnostic computer 40 includes a feature described as DOT control. DOT control has the ability to send one of the plurality of messages 56 to the automatic diagnostic test circuit 100 that changes the data path within the signature analyzer card 102. The plurality of binary words 54 or the second plurality of binary words 340 may pass through the diagnostic holding register card 36 intitally, the input buffer 130 or one of the holding registers 260, 262 respectfully and exit the output multiplexer 132. During the signature analyzer mode of operation, the diagnostic holding register card 36 clocks the plurality of binary words 54 at a faster rate than in the diagnostic holding register mode, for example at one clock pulse of two hundred nanoseconds.

The signature bus 112 and the bypass bus 136 are each monitored to provide a visual indication of what logical value is on the respective bus at any instant of time. The monitoring device is an aid to repair persons and is not a normal step of the automatic diagnostic testing circuit 100. The monitoring device of the signature bus 112 includes the first logical inverter gate 300, the first resistor 302, the first light-emitting diode 304 and the first voltage terminal 306. The monitoring device of the bypass bus 136 includes the second logical inverter gate 308, the second resistor 310, the second light-emitting diode 312 and the second voltage terminal 314. The first voltage terminal 306 and the second voltage terminal 314 are each connected to a positive five volt source. The light-emitting diodes 304 and 312 are representative of a plurality of light emitting diodes across the sixteen conductors of each bus. When a logical one appears on the signature bus 112, at least one light-emitting diode 304 on the signature bus 112 emits electromagnetic radiation during the time one of the compressed serial binary bits 148 is a logical one. When a logical one appears on the bypass bus 136, at least one light-emitting diode 312 emits electromagnetic radiation during the time one bit of one word of the plurality of buffer output words 138 is a logical one. The purpose of the light-emitting diodes 304 and 312 are to provide visual indication when the logical value on the bus is a logical one. Thus, the inverters 300 and 308 provide a logical zero voltage level on the line side of each light-emitting diode 304 and 312. Then the positive five volt source provides a forward bias on the light-emitting diodes 304 and 312 to provide conduction and electromagnetic emission.

The signature analyzer card 102 further includes an input test bus 344 for receiving input test data from the diagnostic computer 40 for testing and verifying the accuracy of the signature analyzer card 102 prior to use as a diagnostic apparatus. The input test bus 344 is shown connected to the input buffer 130 but it should be understood that the input test bus 344 could also be connected to either the first holding register 260 or the second holding register 262 of the plurality of holding registers 184. Thus, in the preferred embodiment, the input buffer 130 distributes the plurality of buffer output words 138 in the diagnostic mode and distributes test data from the diagnostic computer in the testing mode.

Figure 6:
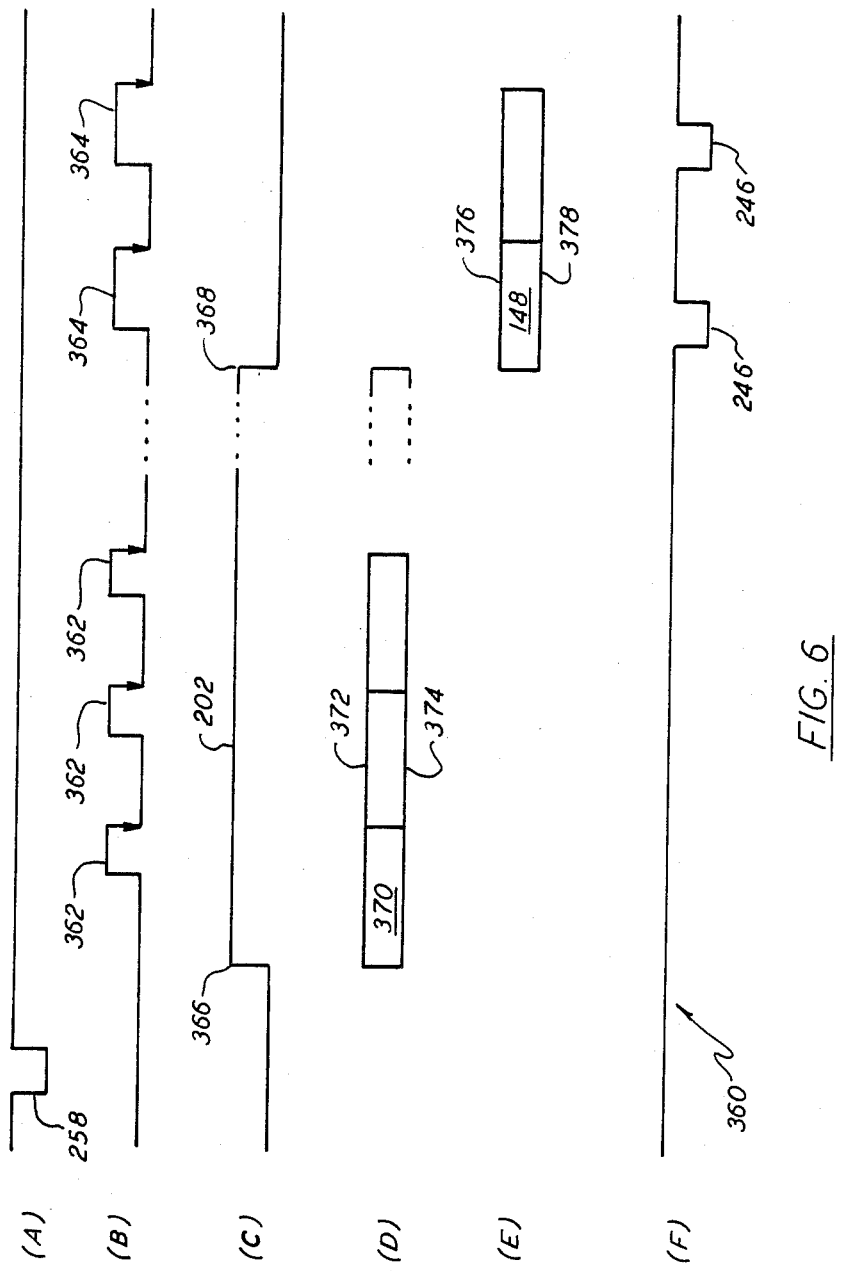
FIG. 6, comprised of FIGS. 6A–6F, is a timing cycle diagram of the signature analyzer card of FIG. 3.

In FIG. 6, there is illustrated six typical cycle redundancy circuit timing diagrams referred to by the general reference character 360. The Generator Clear Not input signal 258 is transmitted to the cycle redundancy circuits 106 to establish a known reference state as is shown in FIG. 6A. In FIG. 6B, a Synchronous Clock signal 362 is shown which is transmitted from the read/write multiplexer 194 to the cycle redundancy check generator 104. During the write data in mode, the Read/Write Multiplexer output signal 256 assumes the identity of the Synchronous Clock signal 362. During the read signature out mode, the Read/Write Multiplexer output signal 256 assumes the identity of an Asynchronous Clock signal 364 also shown in FIG. 6B. The Synchronous Clock signal 362 is duplicate to the timing clock signal of the logic subsystem 24 shown in FIG. 1. The Synchronous Clock signal 362 is employed to write into the cycle redundancy circuits 106 the plurality of buffer output words 138. Since the plurality of buffer output words 138 originates in the logic subsystem 24 and is generated by the Synchronous Clock signal 362, the plurality of buffer output words 138 must be clocked into the cycle redundancy circuits 106 by the Synchronous Clock signal 362. The internal logic of the cycle redundancy circuits 106 responds to the Synchronous Clock signal 362 and accepts the zero through the two thousand and forty-seventh binary word 54 until all two thousand and forty-eight binary words 54 are clocked in. The Asynchronous Clock signal 364 is transmitted to the cycle redundancy check generator 104 from the diagnostic computer 40 and is a different clock frequency than the Synchronous clock signal 362. The Asynchronous Clock signal 364 is used during the read signature out mode to clock the compressed serial binary bits 148 out of all the cycle redundancy circuits 106 and into the diagnostic computer 40 at a different clock frequency. Thus, the Read/Write Multiplexer output signal 256 either writes in or reads out each data bit on the trailing edge of the logical one to zero transition. In FIG. 6C, the Read Not/Write control signal 202 becomes a logical one at a point 366 and becomes a logical zero at a point 368. At the point 366 where the Read Not/Write control signal 202 is the logical one, the write data in mode is initiated and continues until all two thousand and forty-eight binary words 54 are clocked into the cycle redundancy circuits 106. All other timing control signals depend upon this starting point. After all two thousand and forty-eight binary words 54 are clocked in, the Read Not/Write control signal 202 returns to logical zero at point 368.

In FIG. 6D, the plurality of binary words 54 are illustrated beginning with a write word zero 370. Since each binary word 54 can be a logical one or a logical zero, a double line is shown with a high line 372 indicating a logical one and a low line 374 indicating a logical zero. Since the cycle redundancy circuits 106 are designed to change state on a negative going edge of the clock pulse, the zero binary word 54 is clocked in on the negative trailing edge of the zero Synchronous Clock signal 362. The voltage level of each binary word 54 overlaps the trailing edge of the Synchronous Clock signal 362 and as each logical one to logical zero transition occurs, all two thousand and forty-eight binary words 54 are clocked in. At this point the subsystem Synchronous Clock signal 362 terminates. In FIG. 6E, the area that corresponds to writing in the binary words 54 of FIG. 6D is invalid. That is there is not a signal at the output of the cycle redundancy circuits 106. The diagnostic computer 40 initiates the Asynchronous Clock signal 364 and the signature analyzer card 102 switches to the read signature out mode. The first of the sixteen compressed serial binary bits 148 forming the first sixteen bit generator output word 110 is clocked out on the trailing edge of the Asynchronous Clock signal 364. The sixteen generator output words 110 form the output signature 108 and transmit it to the signature bus 112. The compressed serial binary bits 148 may be a logical one or a logical zero and thus a high line 376 symbolizes a logical one while a low line 378 symbolizes a logical zero.

In FIG. 6F, the Input Strobe Not input signal 246 from the diagnostic computer 40 is shown. The Input Strobe Not input signal 246 is transmitted to the multiplexer decoder 242 and to the output multiplexer 132 for providing the only timing pulse received from the diagnostic computer 40 for generating the Asynchronous Clock signal 364. The Input Strobe Not input signal 246 is received from the diagnostic computer 40 and the Asynchronous Clock signal 364 is actually generated on the signature analyzer card 102. As the Asynchronous Clock signal 364 makes a logical one to a logical zero transition, each compressed serial binary bit 144 is read out of each cycle redundancy circuit 106.

Thus, a method has been disclosed for analyzing the binary data 80 of the circuit card 22 under test which includes clocking in the first plurality of input binary data 80 received from the input data bus 118 for providing the plurality of buffer output words 138 and providing the plurality of timing control signals for controlling the process of analysis of the plurality of buffer output words 138. Next, selection of the operational mode is made from the write data in mode and the read signature out mode employing one of the plurality of timing control signals for providing the Read/Write Multiplexer output signal 256. Then the method provides writing in the plurality of buffer output words 138 for accumulating and compressing the logical value of the buffer output words 138 for providing the plurality of compressed serial binary bits 148. Next, the method provides for generating the output signature 108 comprised of the plurality of compressed serial binary bits 148 for recognizing the first plurality of input binary data 80 and reading out the output signature 108 onto the signature bus 112 for facilitating the analysis of the first plurality of input binary data 80. Finally, the method includes selecting the output signal from the output signature 108 on the signature bus 112 and the plurality of buffer output words 138 on the bypass bus 136 according to one of the plurality of timing control signals for providing the output signal to the diagnostic analysis and comparing the output signal with the table of accurate values 58 for providing verification of the first plurality of input binary data 80.

The method may additionally include selecting and decoding one of the plurality of timing control signals for providing the plurality of In Strobe signals 116 for enabling the first plurality of input binary data 80 onto the input data bus 118. Also, the second plurality of input binary words 340 received from one of the auxiliary input data busses 268, 284 may be delayed in transmission for providing stabilization of the voltage level of the second plurality of input binary words 340. Finally, the method may include monitoring the signature bus 108 and the bypass bus 136 for providing a continuous visual indication of the logical value of the plurality of compressed serial binary bits 148 and the plurality of buffer output words 138.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

I claim:

1. A signature analyzer card comprising, in combination:

an input buffer connected to an input data bus in electrical communication with a circuit card under test, said input buffer for serially receiving from said input data bus a first plurality of words and for providing a plurality of buffer output words, each of said first plurality of words and each of said plurality of buffer output words being sixteen bits wide, said first plurality of words representing a plurality of binary data located within said circuit card under test;

a cycle redundancy check generator connected to the input buffer and including a plurality of cycle redundancy circuits, each of said cycle redundancy circuits receiving one bit of each of said words of said plurality of buffer output words through an input lead, each bit of each buffer output word forming one bit of one of a plurality of serial binary bit streams, the logical state of each of said cycle redundancy circuits being dependent upon the logical value of each bit of each of said serial binary bit stream transmitted to each of said plurality of cycle redundancy circuits for providing a plurality of compressed serial binary bits on an output lead of each of the cycle redundancy circuits forming an output signature transmitted to a signature bus, said output signature having fewer binary words than said first plurality of words received on said input data bus;

a control block electrically connected to the cycle redundancy check generator for providing a plurality of timing control signals to the signature analyzer card;

an in strobe multiplexer electrically connected to the control block for selecting a first of said plurality of timing control signals, said first timing control signal being comprised of four binary bits and being transmitted to a multiplexer decoder for decoding said four binary bits and for providing a plurality of in strobe signals for enabling said plurality of binary data onto said input data bus; and an output multiplexer connected to said signature bus and to a bypass bus, said signature bus transporting said output signature from the cycle redundancy check generator to the output multiplexer and said bypass bus transporting said plurality of buffer output words from the input buffer to the output multiplexer, the output multiplexer for selecting the signature bus for transmitting said output signature to a diagnostic computer for comparison with a first expected logical character stored in said diagnostic computer when a signature analyzer control signal is a logical one and the output multiplexer for selecting the bypass bus for transmitting said plurality of buffer output words to said diagnostic computer for comparison with a second expected logical character stored in said diagnostic computer when said signature analyzer control signal is a logical zero, said first expected logical character having fewer binary words than said second expected logical character, said comparison with said first and said second expected logical characters for verifying the accuracy of said plurality of binary data and for isolating a failure to said circuit card under test.

2. The signature analyzer card of claim 1 wherein said first plurality of words transmitted to the input buffer includes two thousand and forty-eight serially transmitted words, said input buffer being an inverting tri-state buffer.

3. The signature analyzer card of claim 1 wherein said output signature is comprised of a plurality of generator output words each being sixteen bits wide and each bit being comprised of a compressed portion of one of said serial binary bit streams for providing each of said generator output words, said compressed serial binary bit stream being provided by a changing logical state of each of said cycle redundancy circuits.

4. The signature analyzer card of claim 3 wherein said plurality of generator output words is comprised of sixteen generator output words transmitted serially onto said signature bus.

5. The signature analyzer card of claim 3 wherein each of said plurality of cycle redundancy circuits employs an electronic logic circuit for facilitating said changing logical state of each of said cycle redundancy circuits.

6. The signature analyzer card of claim 3 wherein said first expected logical character stored in said diagnostic computer for comparison with said plurality of generator output words is comprised of sixteen logical words, each of said logical words being sixteen bits wide.

7. The signature analyzer card of claim 1 wherein the plurality of cycle redundancy circuits is comprised of sixteen cycle redundancy circuits arranged in a parallel configuration having one of said input leads and one of said output leads connected to each of the cycle redundancy circuits, the cycle redundancy check generator employing sixteen of said input leads and sixteen of said output leads, said input leads providing a generator input bus and said output leads providing said signature bus.

8. The signature analyzer card of claim 1 wherein said multiplexer decoder decodes said four binary bits for providing a plurality of multiplexer decoder outputs, said plurality of multiplexer decoder outputs being said plurality of in strobe signals for enabling said first plurality of words onto said input data base.

9. The signature analyzer card of claim 1 wherein said plurality of in strobe signals includes sixteen in strobe signals transmitted to said circuit card under test.

10. The signature analyzer card of claim 1 wherein said signal analyzer control signal is a second of said plurality of timing control signals of the control block.

11. The signature analyzer card of claim 1 wherein the output multiplexer is comprised of a tri-state inverting type multiplexer.

12. The signature analyzer card of claim 1 wherein said plurality of buffer output words includes two thousand and forty-eight buffer output words, each of said buffer output words being sixteen bits wide.

13. The signature analyzer card of claim 1 wherein said second expected logical character stored in said diagnostic computer for comparison with said plurality of buffer output words is comprised of two thousand and forty-eight logical words, each of said logical words being sixteen bits wide.

14. The signature analyzer card of claim 1 wherein the control block further includes a parameter register for receiving a plurality of parameter bits from a parameter bus, said plurality of parameter bits being clocked into said parameter register for providing a plurality of parameter register output signals, said plurality of parameter register output signals being included within said plurality of timing control signals for controlling said signature analyzer card.

15. The signature analyzer card of claim 14 wherein said plurality of parameter bits received by said parameter register is comprised of eight parameter bits, said parameter register being enabled by a load enable signal transmitted from a parameter memory, said load enable signal being a third of said plurality of timing control signals and being a strobe signal for the parameter bus for enabling said eight parameter bits and for clocking said eight parameter bits into said parameter register.

16. The signature analyzer card of claim 15 further including a parameter decoder connected to said parameter register for receiving two of said plurality of parameter register output signals and for providing a plurality of enabling output signals to the signature analyzer card, said two of said plurality of parameter register output signals being a fourth and a fifth of said plurality of timing control signals.

17. The signature analyzer card of claim 16 wherein a first of said plurality of enabling output signals is an enable input buffer signal transmitted to the input buffer on said input data bus for enabling the input buffer to receive said first plurality of words, said enable input buffer signal being a sixth of said plurality of timing control signals.

18. The signature analyzer card of claim 16 further including a plurality of holding registers electrically connected to the control block, one of said plurality of holding registers for receiving and delaying the transmission of a second plurality of words and for stabilizing the voltage level of said second plurality of words, each of said second plurality of words being sixteen bits wide and received serially from one of a plurality of auxiliary data buses, said second plurality of words representing a plurality of binary data located within said circuit card under test and wherein a first of said plurality of holding registers being enabled by a seventh of said plurality of timing control signals and a second of said plurality of holding registers being enabled by an eighth of said plurality of timing control signals, said plurality of holding registers having a single holding register output for transmission to the cycle redundancy check generator and to the output multiplexer.

19. The signature analyzer card of claim 18 wherein a second of said plurality of enabling output signals is an enable first auxiliary bus signal transmitted to said first of said plurality of holding registers on a first of said plurality of auxiliary enabling buses, said enable first auxiliary bus signal being said seventh of said plurality of timing control signals for enabling said first of said plurality of holding registers to receive said second plurality of words.

20. The signature analyzer card of claim 18 wherein a third of said plurality of enabling output signals is an enable second auxiliary bus signal transmitted to said second of said plurality of holding registers on a second of said plurality of auxiliary enabling buses, said enable second auxiliary bus signal being said eighth of said plurality of timing control signals for enabling said second of said plurality of holding registers to receive said second plurality of words.

21. The signature analyzer card of claim 18 wherein said second plurality of words transmitted to one of said plurality of holding registers includes two thousand and forty-eight serially transmitted words each being sixteen bits wide, each of said plurality of holding registers being of a tri-state type.

22. The signature analyzer card of claim 1 wherein said signature bus and said bypass bus further include a plurality of light-emitting diodes for monitoring said signature bus and said bypass bus, at least one of said light-emitting diodes emitting electromagnetic radiation during the time one of said plurality of compressed serial binary bits is a logical one and during the time one bit of one of said words of said plurality of buffer output words is a logical one.

23. The signature analyzer card of claim 1 further including an input test bus for receiving a plurality of input test data from said diagnostic computer for testing and verifying the accuracy of the signature analyzer card.

24. The signature analyzer card of claim 1 further including a read/write multiplexer connected to the cycle redundancy check generator for receiving a read out clock signal from a first logic gate and a write in clock signal from a second logic gate and a read not/write control signal from said parameter register, said read out clock signal and said write in clock signal being multiplexed within said read/write multiplexer for providing a read/write multiplexer output signal to the cycle redundancy check generator, said read/write multiplexer output signal being said write in clock signal when said read not/write control signal is a logical one for accumulating said plurality of serial binary bit streams within each cycle redundancy circuit and said read/write multiplexer output signal being said read out clock signal when said read not/write control signal is a logical zero for transmitting said output signature to said signature bus.

25. The signature analyzer card of claim 24 wherein said first logic gate is a logical inverter having an output strobe not input signal and wherein said read out clock signal being a ninth of said plurality of timing control signals.

26. The signature analyzer card of claim 25 wherein said second logic gate is a logical nor having an enable in not input signal and a clock in not input signal and wherein said write in clock signal being a tenth of said plurality of timing control signals.

27. The signature analyzer card of claim 26 wherein said read not/write control signal being an eleventh of said plurality of timing control signals.

28. A method for analyzing the binary data of a circuit card under test, said method comprising the steps of:
- clocking in a first plurality of input binary data received from said circuit card under test through an input data bus for providing a plurality of buffer output words;
- providing a plurality of timing control signals for controlling the process of analysis of said plurality of buffer output words;
- selecting an operational mode from a write data in mode and a read signature out mode employing one of said plurality of timing control signals for providing a read/write multiplexer output signal;
- writing in said plurality of buffer output words into each of sixteen cycle redundancy circuits for accumulating the logical value of each of said plurality of buffer output words;
- compressing said plurality of buffer output words for providing a plurality of compressed serial binary bits;
- generating an output signature comprised of said plurality of compressed serial binary bits for recognizing said first plurality of input binary data;
- reading out from said sixteen cycle redundancy circuits said output signature onto a signature bus for facilitating the analysis of said first plurality of input binary data;
- selecting an output signal from said output signature on said signature bus and said plurality of buffer output words on a bypass bus according to one of said plurality of timing control signals for exposing said output signal to a diagnostic analysis; and
- comparing said output signal with a table of accurate values for providing verification of said first plurality of input binary data.

29. The method for analyzing the binary data of the circuit card under test of claim 28 further including the step of selecting and decoding one of said plurality of timing control signals for providing a plurality of in strobe signals for enabling said first plurality of input binary data onto said input data bus.

30. The method for analyzing the binary data of the circuit card under test of claim 29 further including the step of monitoring said signature bus and said bypass bus for providing a continuous visual indication of the logical value of said plurality of compressed serial binary bits and said plurality of buffer output words.

31. The method for analyzing the binary data of the circuit card under test of claim 30 further including the step of delaying the transmission of a second plurality of input binary data received from an auxiliary input data bus for providing stabilization of the voltage level of said second plurality of input binary data.

* * * * *